United States Patent
Ubowski

(10) Patent No.: US 6,618,758 B1
(45) Date of Patent: Sep. 9, 2003

(54) SYSTEM FOR DOWNLOADING ONLY A PORTION OF A FILE FROM A SERVER THROUGH A COMPUTER NETWORK UTILIZING A CLIENT MENU DOWNLOADED PERIODICALLY FROM THE SERVER

(75) Inventor: Richard M. Ubowski, Harleyville, PA (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/506,763

(22) Filed: Feb. 18, 2000

(51) Int. Cl.[7] .............................................. G06F 15/16
(52) U.S. Cl. ...................... 709/232; 709/203; 709/213; 709/217; 709/218; 709/233; 707/1; 707/2; 707/101; 707/104
(58) Field of Search ................... 709/203, 213, 709/232, 233, 217, 218; 707/1, 2, 101, 104

(56) References Cited

U.S. PATENT DOCUMENTS

| | | | | |
|---|---|---|---|---|
| 5,884,056 A | * | 3/1999 | Steele | 345/738 |
| 5,966,135 A | * | 10/1999 | Roy et al. | 345/619 |
| 6,061,733 A | * | 5/2000 | Bodin et al. | 709/233 |
| 6,073,148 A | * | 6/2000 | Rowe et al. | 707/542 |
| 6,166,735 A | * | 12/2000 | Dom et al. | 345/749 |
| 6,337,693 B1 | * | 1/2002 | Roy et al. | 345/619 |
| 6,339,785 B1 | * | 1/2002 | Feigenbaum | 709/213 |
| 6,377,974 B1 | * | 4/2002 | Feigenbaum | 709/203 |
| 2002/0147688 A1 | * | 10/2002 | Arai | 705/52 |

* cited by examiner

*Primary Examiner*—Nabil El-Hady

(57) ABSTRACT

A system for use in downloading a file from a server through a computer network to a client. In one embodiment, the system can include a subfile selector that has: (1) a subfile designator, associated with the client, that receives data designating only a portion of the file to be downloaded to the client and (2) a subfile requestor, associated with the subfile designator, that transmits a server request based on the data. The system can further include a subfile responder that has: (1) a subfile designation receiver, associated with the server, that receives the server request and (2) a subfile transmitter, associated with the subfile designation receiver, that initiates a download of only the portion, the computer network thereby relieved of having to communicate an entirety of the file.

32 Claims, 2 Drawing Sheets

SYSTEM FOR DOWNLOADING ONLY A PORTION OF A FILE FROM A SERVER THROUGH A COMPUTER NETWORK UTILIZING A CLIENT MENU DOWNLOADED PERIODICALLY FROM THE SERVER

TECHNICAL FIELD OF THE INVENTION

The present invention is directed, in general, to computer systems and, more specifically, to a system and method for use in downloading a file from a server through a computer network to a client.

BACKGROUND OF THE INVENTION

The growth of information is occurring at an exponential rate and is being driven by the growth of technology, especially in the computer and telecommunications areas. Not only are computer-organized databases proliferating, the need for a workforce to gain access to these databases on a routine basis is also increasing rapidly. This is especially true for those organizations where a portion of the workforce is mobile, such as sales or field representatives. Of course, the number of remotely located workers who are located either mainly in their home or a small, remote office location is rapidly increasing as well.

Access to the appropriate databases is typically provided through a network. This network may be a local area network or a wide area network that is proprietary to an organization that workers dial into via telephone connections. Another network used included the Internet. Increasingly, remote workers have used the Internet due to its easy accessability and the international availability.

As the number of users on the Internet and other networks increased, both the access times and the information transfer times have typically suffered due to congestion. This situation has caused a user to have to make several attempts to download files due to congestion causing the user to be "bumped" or the download information being lost. For example, if a user was performing a "research project", the number of incomplete attempts to download all the files may represent a substantial investment of time for the user. Of course, many of these downloads typically prove to be of marginal value since often a complete document or the entire information set must be downloaded to obtain an understanding of what the document or information contains. This situation is a main contributor in causing a congested state or condition on the network which in turn lowers the overall effectiveness and efficiency of the network.

The downloading of a complete document or set of information also leads to considerable wasted time for the user, which greatly lowers the productivity for a worker and therefore increases overall costs. Since the number of "knowledge workers" is increasing, the impact of this phenomenon is increasing as well, and improved methods are needed to at least maintain current productivity levels or provide increased productivity Accordingly, what is needed in the art is a way to effectively search a selected file and download selected information from files located on the network.

SUMMARY OF THE INVENTION

To address the above-discussed deficiencies of the prior art, the present invention provides a system for use in downloading a file from a server through a computer network to a client. In one embodiment, the system can include a subfile selector that has: (1) a subfile designator, associated with the client, that receives data designating only a portion of the file to be downloaded to the client and (2) a subfile requester, associated with the subfile designator, that transmits a server request based on the data. The system can further include a subfile responder that has: (1) a subfile designation receiver, associated with the server, that receives the server request and (2) a subfile transmitter, associated with the subfile designation receiver, that initiates a download of only the portion, the computer network thereby relieved of having to communicate an entirety of the file.

The present invention therefore introduces the broad concept of allowing a client to download only selected portions of a file ("subfile"), instead of the entire file. This alleviates needless network traffic that results when undesired portions of files are downloaded.

In one embodiment of the present invention, the subfile designator generates a prompt to a user to receive the data. In another embodiment, the subfile designator generates a menu of subfile selections to a user. In yet another embodiment, the subfile designator receives the data from a preferences file associated with the client.

In one embodiment of the present invention, the file contains data delineating the portion. In another embodiment, the subfile transmitter examines the file to locate the portion. In yet another embodiment, the subfile transmitter bases the portion on a display capability of the client.

In one embodiment of the present invention, the file is selected from the group consisting of: (1) a word processing document, (2) a spreadsheet and (3) an image. Those skilled in the pertinent art will perceive, however, that the file can be of any type whatsoever.

In one embodiment of the present invention, the portion of the file is selected from the group consisting of: (1) a screenfull, (2) a page and (3) a document subdivision. For purposes of the present invention, a "screenfull" is a portion of a file that can be displayed on a user's display device at one time. For purposes of the present invention, a "page" is a portion of a file that can be printed on a single sheet of paper. Frequently, "screenfulls" are less than "pages" by virtue of display device limitations. For purposes of the present invention, a "document subdivision" is a logical portion of a file, such as a table of contents, chapter or glossary of a word processing document, or a section of a spreadsheet.

In one embodiment of the present invention, the computer network is the Internet. Those skilled in the art will perceive, however, that any computer network falls within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
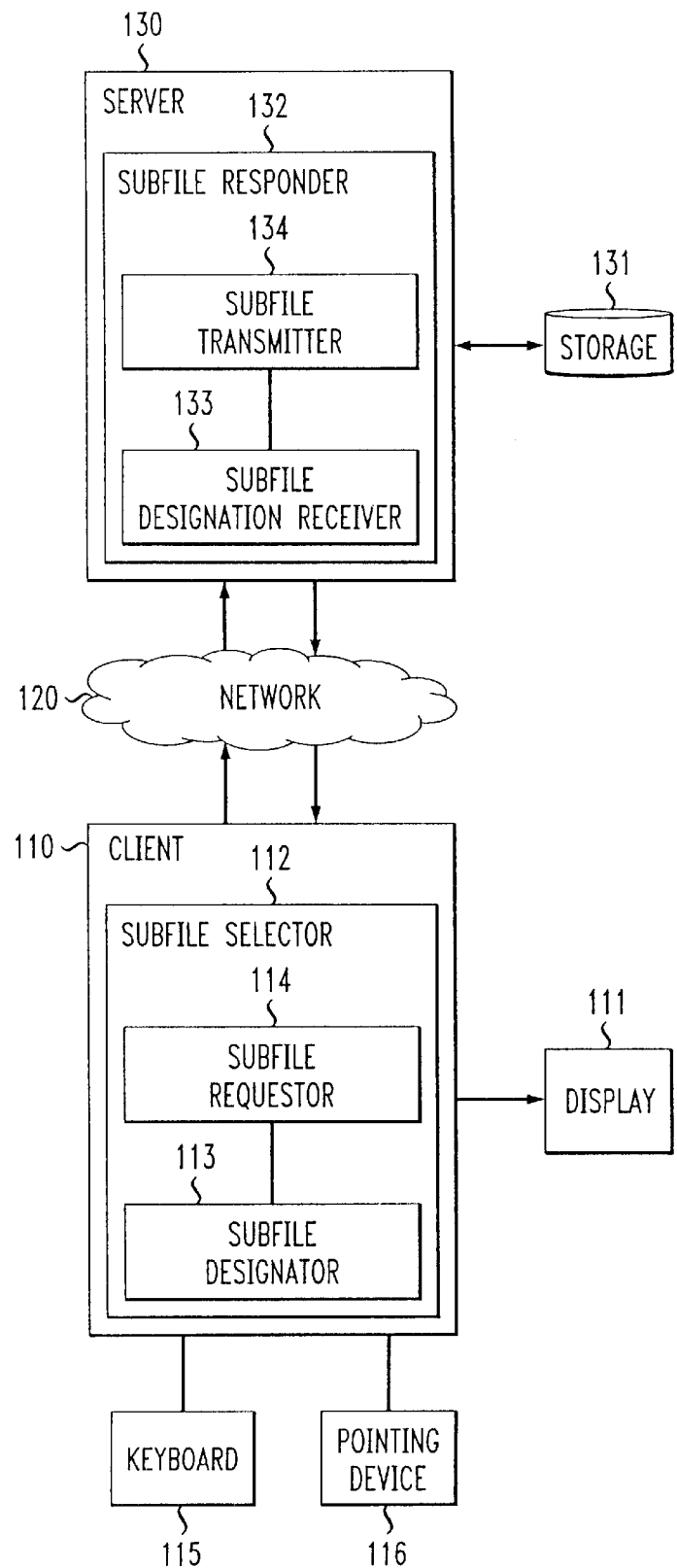
FIG. 1 illustrates an embodiment of a system for downloading a portion of a file constructed according to the principles of the present invention.

Referring initially to FIG. 1, illustrated is an embodiment of a system for downloading a portion of a file, generally designated 100, constructed according to the principles of the present invention. The system 100 includes a client 110 having a display 111, a keyboard 115 and a pointing device 116 associated therewith, a computer network 120 and a server 130 having a storage unit 131. The client 110 includes a subfile selector 112 having a subfile designator 113 and a subfile requester 114. The server 130 includes a subfile responder 132 having a subfile designation receiver 133 and a subfile transmitter 134. The client 110 and the server 130 communicate via the computer network 120, which in the present embodiment is the Internet. Of course, in other embodiments the computer network 120 may be an Intranet or any other appropriate network supporting computer communication such as a WAN or LAN. In other embodiments of the present invention, the system 100 may have any number of clients 110, servers 130, and networks 120.

The system 100 may be used for downloading a file or a portion of a file ("subfile") from the server 130 through the computer network 120 to the client 110. The subfile designator 113, which is associated with the subfile selector 112, receives data that may designate which portion or portions of the file to be downloaded to the client 110 from the server 130. The selection of this data may be provided through the keyboard 115 or using the pointing device 116 in concert with the display 111 in this embodiment. In one embodiment, the subfile designator 113 may generate a prompt to a user to allow the user to enter data representing the portion of the file to be downloaded. In another embodiment, the subfile designator 113 may generate a menu of the subfile selections for the user to select from. In yet another embodiment, the subfile designator 113 may receive the data that determines which portion of a file to download from a preferences file associated with the client 110, or the file to be downloaded may contain data delineating the portion of the subfile.

The file may be a word processing document, a spreadsheet or an image. The file may include reports, product or service brochures, technical articles, abstracts or any other such documents. The file may also include tables of information, matrices of data, financial information, mathematical calculations as well as images such as photographs or other graphically-based structures. Those skilled in the pertinent art will perceive, however, that the file can be of any type whatsoever. The subfile may be any portion of the file. The subfile may be a page, a screenfull or any other document subdivision.

The subfile requestor 114, which is associated with the subfile designator 113 and the subfile selector 112, transmits a server request based on the data received by the subfile designator 113. The server request is communicated through the network 120 to the subfile responder 132. The subfile designation receiver 133, associated with the subfile responder 132, receives the server request and may interpret the data related to the file portion being requested or pass the data to the subfile transmitter 134.

The subfile transmitter 134, associated with the subfile designation receiver 133, initiates a download of only the portion of the file requested thereby relieving the computer network of having to communicate an entirety of the file unless requested. In the illustrated embodiment, the subfile transmitter 134 examines the file to locate the portion that has been requested. In yet another embodiment, the subfile transmitter 134 may base the portion of the file on a display capability of the client 110. These and other embodiments may incorporate similar options constructed according to the principles of the present invention.

The present invention therefore introduces the broad concept of allowing a client to download only selected portions of a file, instead of the entire file. This alleviates needless network traffic that results when undesired portions of files are downloaded as well as saving time the user spends downloading information.

In one embodiment, the user may enter a page number to be downloaded, a range of pages, or a combination of single pages and a range of pages. The user may set a preference to always download the first page of a file, a table of contents or an index, as appropriate. Additionally, the user may enter a single keyword or a collection of key-phrases, and have the pages containing these keywords or key-phrases downloaded. The key-phrases may also include figure numbers or other identifiers that identify graphics presentations to be downloaded. In other embodiments of the present invention may include any method of selecting a portion of a file, partitioning a file, or selecting a piece of information to be downloaded.

Figure 2:
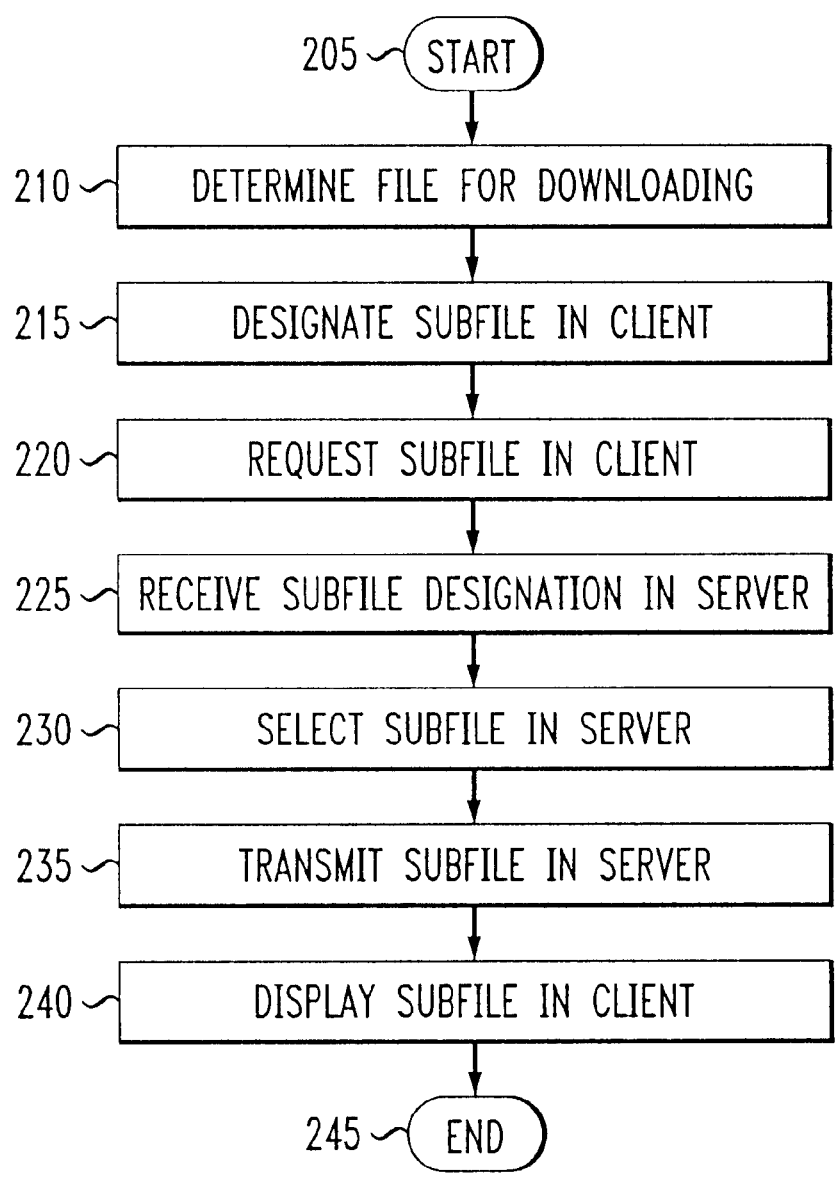
FIG. 2 illustrates a flowchart of an embodiment of a method for use in identifying and downloading a portion of a file.

Turning now to FIG. 2, illustrated is a flowchart of an embodiment of a method 200 for use in identifying and downloading a portion of a file. The method 200 begins in a step 205 wherein a user employing a client connected through a network to a server desires to download at least a portion of a file, also called a subfile.

The user determines the file for downloading employing the client in a step 210. In one embodiment, subfile designator allows a user to select the portion of a file to download from a menu of possible files in the step 210. The files can include a word processing document containing a spreadsheet and several images. The subfile designator may also display submenus, associated with each particular word processing document, that allows the user to select different parts of the word processing document to download such as a table of contents, an index or a glossary of terms. The menu and submenus reside in the client and are downloaded periodically from the server via the network such as the Internet.

In another embodiment of the present invention, the subfile designator communicates with a subfile designation receiver in a server via the computer network to provide to the user a prompt of available files to download. The subfile designator may also prompt the user for the portion of the file or subfile to download.

Next, the user designates the subfile to download in a step 215 using a display, a pointing device and a keyboard associated with the client to select submenu items corresponding to a portion of the file for downloading. In the illustrated embodiment, the pointing device is a conventional mouse. Initially, the user may select the table of contents as the subfile to download in the step 215.

The subfile requester sends the user selected subfile to download to the in the server in a step 220 via the computer network. In this example, the subfile designation request containing the table of contents is sent to the server.

The subfile designation receiver, associated with the server, receives the subfile designation request from the subfile requester in a step 225. The server then searches a variety of databases contained in both internal storage unit and the external storage unit until the server locates the requested file. The server then retrieves the requested file and selects the requested subfile within the file to download in a step 230. In this example, the table of contents is the subfile to download.

In one embodiment of the present invention, the subfile transmitter examines the file to determine if the file contains an embedded code delineating that the portion selected requires a special format, or that there is another portion that is always included in the download of the file.

The embedded code, if present, may also indicate certain parameters about the client making the request that are pertinent to downloading to the client. For example, the portion of the file requested may require a special format based on a display capability of the client, such as the ability to accommodate only a screenful, an entire page or an entire document subdivision. Of course, such information may also be contained in the request from the client.

Once the subfile transmitter has obtained and possibly converted the requested subfile, the subfile transmitter transmits the subfile to the client in a step 235. The requested subfile is displayed on the display associated with the client in a step 240. The method 200 ends processing in a step 245.

In another embodiment, the method 200 may allow the user to determine what additional portions of the file to be downloaded and allow the user to download those portions. In yet another embodiment, the method may repeat the steps 210 through 240 allowing the user to select additional files or subfiles to be downloaded. One skilled in the art should know that the present invention is not limited to the method listed above. Other embodiments of the present invention may have additional or fewer steps than described above.

Although the present invention has been described in detail, those skilled in the art should understand that they can make various changes, substitutions and alterations herein without departing from the spirit and scope of the invention in its broadest form.

What is claimed is:

1. For use in downloading a file from a server through a computer network to a client, a subfile selector, comprising:
   a subfile designator, associated with said client, that receives data containing a keyword or key-phrase within said file designating only a portion of said file to be downloaded to said client; and
   a subfile requester, associated with said subfile designator, that transmits a server request based on said data to prompt said server to initiate a download of only said portion, said computer network thereby relieved of having to communicate an entirety of said file;
   wherein said subfile designator generates a menu of subfile selections based on menu information downloaded periodically from said server via said computer network.

2. The subfile selector as recited in claim 1 wherein said subfile designator generates a prompt to a user to receive said data.

3. The subfile selector as recited in claim 1 wherein said subfile designator receives said data from a preferences file associated with said client.

4. The subfile selector as recited in claim 1 wherein said file is selected from the group consisting of:
   a word processing document,
   a spreadsheet, and
   an image.

5. The subfile selector as recited in claim 1 wherein said portion is selected from the group consisting of:
   a screenfull,
   a page, and
   a document subdivision.

6. The subfile selector as recited in claim 1 wherein said portion of said file is a page or pages of said file containing said keyword or key-phrase.

7. For use in downloading a file from a server through a computer network to a client, a subfile responder, comprising:
   a subfile designation receiver, associated with said server, that receives a server request based on data containing a keyword or key-phrase within said file designating only a portion of said file to be downloaded to said client; and
   a subfile transmitter, associated with said subfile designation receiver, that initiates a download of only said portion, said computer network thereby relieved of having to communicate an entirety of said file;
   wherein said designated portion of said file is selected from a generated menu of subfile selections residing at said client, said menu being downloaded periodically from said server via said computer network.

8. The subfile responder as recited in claim 7 wherein said file contains an embedded code delineating said portion.

9. The subfile responder as recited in claim 7 wherein said subfile transmitter employing said embedded code to indicate a type of formatting to be performed on said portion if said portion contains said embedded code.

10. The subfile responder as recited in claim 7 wherein said subfile transmitter bases said portion on a display capability of said client.

11. The subfile responder as recited in claim 7 wherein said file is selected from the group consisting of:
   a word processing document,
   a spreadsheet, and
   an image.

12. The subfile responder as recited in claim 7 wherein said portion is selected from the group consisting of:
   a screenfull,
   a page, and
   a document subdivision.

13. The subfile responder as recited in claim 7 wherein said portion of said file is a page or pages of said file containing said keyword or key-phrase.

14. For use in downloading a file from a server through a computer network to a client, a system, comprising:
   a subfile selector, including:
      a subfile designator, associated with said client, that receives data containing a keyword or key-phrase within said file designating only a portion of said file to be downloaded to said client, said subfile designator also generates a menu of subfile selections based on menu information downloaded periodically from said server via said computer network, and
      a subfile requester, associated with said subfile designator, that transmits a server request based on said data; and
   a subfile responder, including:
      a subfile designation receiver, associated with said server, that receives said server request, and
      a subfile transmitter, associated with said subfile designation receiver, that initiates a download of only said portion, said computer network thereby relieved of having to communicate an entirety of said file.

15. The system as recited in claim 14 wherein said subfile designator generates a prompt to a user to receive said data.

16. The system as recited in claim 14 wherein said subfile designator receives said data from a preferences file associated with said client.

17. The system as recited in claim 14 wherein said file is selected from the group consisting of:

a word processing document, a spreadsheet, and an image.

18. The system as recited in claim 14 wherein said portion is selected from the group consisting of:

a screenfull, a page, and a document subdivision.

19. The system as recited in claim 14 wherein said portion of said file is a page or pages of said file containing said keyword or key-phrase.

20. A method for downloading a file from a server through a computer network to a client, comprising:

receiving data containing a keyword or key-phrase within said file designating only a portion of said file to be downloaded to said client; and transmitting a server request based on said data to prompt said server to initiate a download of only said portion, said computer network thereby relieved of having to communicate an entirety of said file;

wherein said receiving data includes generating a menu of subfile selections residing at said client based on menu information downloaded periodically from said server via said computer network.

21. The method as recited in claim 20 wherein said receiving further comprises generating a prompt to a user to receive said data.

22. The subfile selector as recited in claim 20 wherein said receiving comprises receiving said data from a preferences file associated with said client.

23. The method as recited in claim 20 wherein said file is selected from the group consisting of:

a word processing document, a spreadsheet, and an image.

24. The method as recited in claim 20 wherein said portion is selected from the group consisting of:

a screenfull, a page, and a document subdivision.

25. The method as recited in claim 20 wherein said portion of said file is a page or pages of said file containing said keyword or key-phrase.

26. A method for downloading a file from a server through a computer network to a client, comprising:

receiving a server request based on data containing a keyword or key-phrase within said file designating only a portion of said file to be downloaded to said client; and initiating a download of only said portion, said computer network thereby relieved of having to communicate an entirety of said file;

wherein said designated portion of said file is selected from a generated menu of subfile selections residing at said client based on menu information downloaded periodically to said client via said computer network.

27. The method as recited in claim 26 wherein said file contains an embedded code delineating said portion.

28. The method as recited in claim 26 wherein said file contains an embedded code, said initiating further comprises employing said embedded code to indicate a type of formatting to be performed on said portion if said portion contains said embedded code.

29. The method as recited in claim 26 wherein said initiating further comprises basing said portion on a display capability of said client.

30. The method as recited in claim 26 wherein said file is selected from the group consisting of:

a word processing document, a spreadsheet, and an image.

31. The method as recited in claim 26 wherein said portion is selected from the group consisting of:

a screenfull, a page, and a document subdivision.

32. The method as recited in claim 26 further comprising determining which page or pages of said file contain said keyword or key-phrase and designating said page or pages as said portion of said file.

* * * * *